United States Patent [19]

Reiber

[11] 4,093,297

[45] June 6, 1978

[54] GRASPING DEVICE

[75] Inventor: Edwin E. Reiber, Worthington, Ohio

[73] Assignee: North American Systems, Inc., Bedford Heights, Ohio

[21] Appl. No.: 745,620

[22] Filed: Nov. 29, 1976

[51] Int. Cl.² .............................................. B25G 9/02
[52] U.S. Cl. ................................... 294/99 R; 294/131; 294/8.5
[58] Field of Search ............... 294/99 R, 99 S, 3, 8.5, 294/110, 131; 206/216; 312/43; 221/220, 59

[56] References Cited

U.S. PATENT DOCUMENTS

| | | | |
|---|---|---|---|
| 1,349,889 | 8/1920 | Koch | 294/131 |
| 2,362,395 | 11/1944 | Ozdobinski | 294/99 S |
| 2,541,144 | 2/1951 | Anderson | 294/99 |
| 2,583,903 | 1/1952 | Taylor | 294/99 |
| 2,759,299 | 8/1956 | Bezzerides | 312/43 |
| 3,031,683 | 5/1962 | Hellwig | 294/8.5 |
| 3,216,290 | 11/1965 | Rizzo | 294/99 R |

*Primary Examiner*—James B. Marbert

[57] ABSTRACT

A grasping device is provided having a frame adapted to be held generally stationary with respect to an article being grasped, two manually operable, movable tweezer legs supported by the frame, a third leg positioned between the two movable legs and held generally stationary with respect to the frame, and means at the end of each leg for frictionally engaging an object to be grasped. A preferred embodiment of the grasping device is specially designed for pinching the inside bottom surface of a nested stack of dish-shaped filters.

10 Claims, 8 Drawing Figures

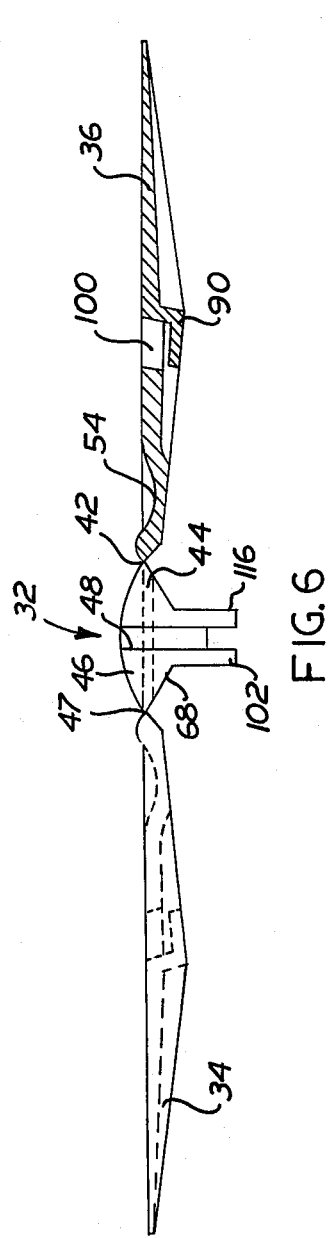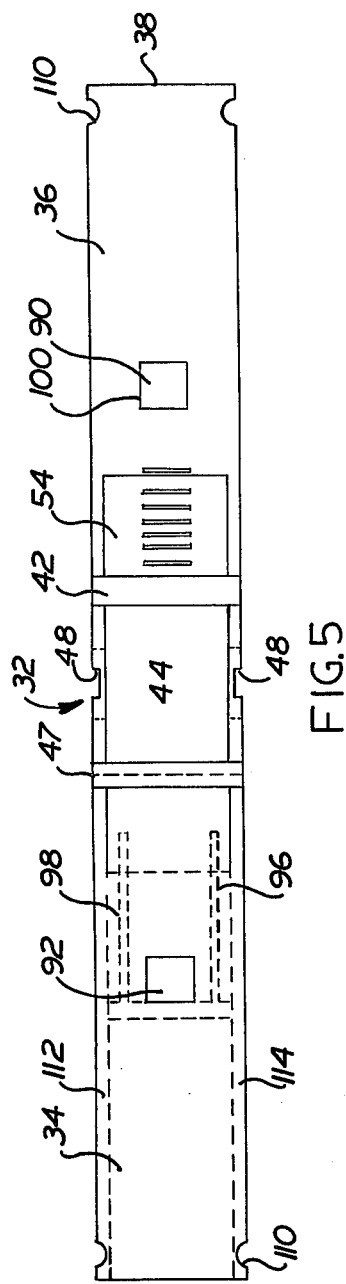

GRASPING DEVICE

BACKGROUND OF THE INVENTION

The present invention relates to a grasping device specially designed for dispensing articles which have little self integrity, such as filters.

Tweezers with frictional caps on the working ends of the movable legs are known for facilitating the grasping of objects. U.S. Pat. No. 2,362,395. It is further known that the top filter in a stack of flat filters may be dispensed by using a device having four movable needles which operatively move toward four stationary guards in order to dispense the top filter from a stack of filters. U.S. Pat. No. 2,541,144.

Automatic drip coffee makers generally require the use of dish-shaped filters which are disposed after each use. Such filters are generally sold in nested stacks of, for example, 15 or more filters. In such a stack, the filters are very difficult to separate manually not only because the sides of the dish-shaped filters are fluted, but also because of the thiness and lack of self-integrity of the filter paper and the proximity of adjacent filters. Generally, the tendency of consumers is to separate the dish-shaped nested filters at their edges which is difficult because of the nature of the stack of filters.

OBJECTS AND SUMMARY OF INVENTION

It is therefore an object of the present invention to provide a grasping device for easily grasping and dispensing objects, such as filters in a stack of nested dish-shaped filters. Further and other objects will become apparent from reading the following summary of invention and description of preferred embodiment, such as provision of a grasping device which is not only relatively simple to produce, but also may be operated in more than one mode.

The grasping device according to the present invention has a frame adapted to be held generally stationary with respect to an article being grasped, two manually operable, movable tweezer legs, a third or stationary leg positioned between the two movable legs and being generally stationary with respect to the frame so that each movable leg is movable relative to the third leg, and a frictional engaging means at the ends of each leg for grasping an object. The movable legs are positioned and adapted for pivotal movement toward the stationary leg such that relative movement of the three legs lies in a common plane and such that the three legs terminate at approximately the same point when the two movable legs are closed against the stationary leg therebetween.

A preferred form of the invention involves the provision of a dish-shaped frame adapted to slidably engage an opening in a container having articles therein to be removed and having:

a. a generally flat support;
b. a side wall at the outer periphery of the support projecting outwardly from a first side of the support;
c. an aperture in the support extending from the first side to a second side thereof;
d. two finger wells adjacent the aperture and projecting from the second side of the support and opening into the first side; and
e. a support riser adjacent the aperture in the support and projecting outwardly from the first side of the support for supporting the stationary leg. Such a frame is provided with a biased tweezer having two movable legs.

Further preferred features involve:

a. finger depressions in the movable legs for receiving an operator's finger;
b. an additional spring to outwardly bias the movable legs toward the finger wells;
c. a support system for positioning the apex of the biased tweezer with respect to the support riser involving forks projecting from the apex and engaging a top surface of the stationary leg, the forks having channels therein for engaging ridges projecting from the support riser.

Such a grasping device is particularly advantageous in pinching the inside bottom surface of a nested group of dish-shaped filters when the filters are located within a container having an opening shaped to slidably engage the grasping device.

DESCRIPTION OF DRAWINGS

Other objects and advantages of the present invention will become apparent from the following detailed description taken in conjunction with the accompanying drawings, in which:

FIG. 5 is a top view of the tweezer shown in FIG. 3 in an extended condition with the right-hand portion being a plan view and the left-hand portion being in phantom to show the structure of the underside;

FIG. 6 is a side view of the tweezer shown in FIG. 5 with the right-hand portion being in cross section and the left-hand portion being in phantom to further demonstrate the structure of the underside;

DESCRIPTION OF PREFERRED EMBODIMENT

Figure 1:
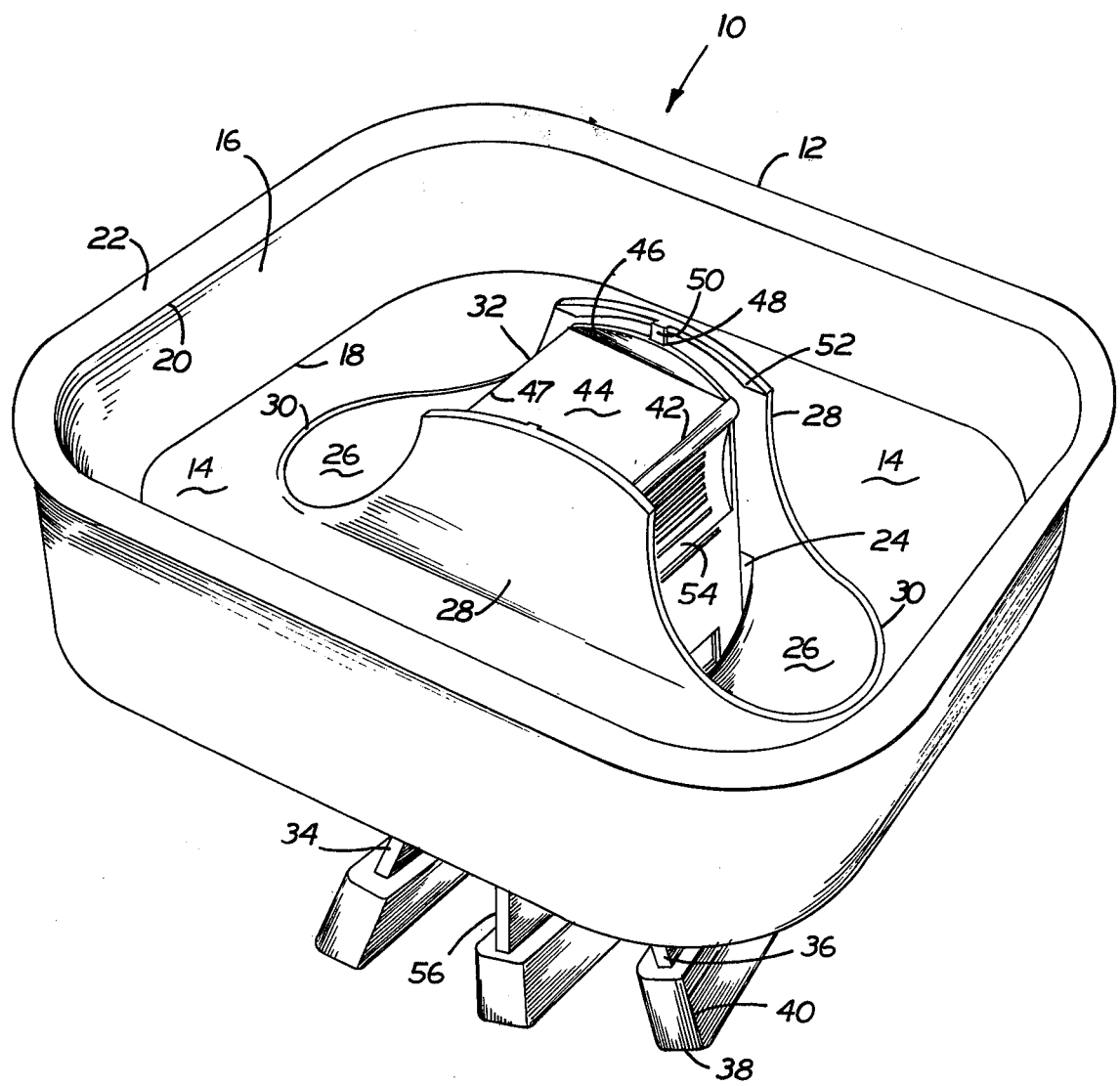
FIG. 1 is a three-dimensional pictorial view of a preferred form of the grasping device of the present invention.

The grasping device 10 shown in the three-dimensional pictorial view of FIG. 1 has a frame 12 which may be of any suitable shape, the preferred shape shown being for purposes more clearly described below in connection with FIG. 8. The preferred form has a square dish-shaped frame having a vertical side wall 16. Frame 12 has a generally flat support 14 and a generally vertically upstanding side wall 16 which projects upwardly at an angle slightly greater than 90° from the outer periphery 18 of the generally flat support 14. The top edge of the side wall 16 is bent at its upper edge 20 to create a rounded flange 22 around the entire periphery of the top edge 20 of side wall 16 for purposes more clearly explained with regard to FIG. 8. In approximately the center portion of generally flat support 14 is a rectangular aperture designated by the numeral 24.

Adjacent the aperture 24 are two finger wells 26, each being disposed at opposite sides of the aperture and being approximately a quarter of a sphere so that the finger wells 26 project downwardly from the generally flat support 14 in a direction generally opposite that of the upstanding vertical side wall 16.

Adjacent the two finger wells 26 and oppositely disposed on the two remaining sides of aperture 24 are two support risers 28 which are generally vertically upstanding walls projecting out from the generally flat support 14 in generally the same direction as the upstanding side wall 16. The support risers 28 gradually taper downwardly and outwardly toward the generally flat support 14 to form a raised rib 30 around the periphery of the finger wells at their junction with the generally flat support 14.

Positioned within aperture 24 is a biased tweezer 32 having two movable legs 34 and 36. Movable leg 36 has a working end generally designated by the numeral 38 which is provided by a frictional engaging means to more easily grasp an article, the preferred frictional engaging means being a rubbery type cap 40 fitting over the end of the movable leg 36. The nonworking end of movable leg 36 is pivoted along a line 42 at its junction with apex 44 of the biased tweezer 32. The structure of the other movable leg 34 is identical to that of movable leg 36, movable leg 34 pivoting about line 47 with apex 44.

Apex 44 comprises a generally rectangular flat plate with raised curvilinear shoulders 46 at the two ends adjacently disposed to support risers 28. Each raised shoulder 46 has a channel 48 to slidably engage a raised ridge 50 protruding inwardly from support riser 28 towards raised shoulder 46. Raised ridge 50 and channel 48 slidably interlock to hold apex 44 generally stationary with respect to the frame 12. A raised boss 52 is also provided on support riser 28 to help maintain tweezer 32 from being accidentially removed during operation.

Adjacent each finger well 26 on each of movable legs 34 and 36 is a finger depression 54 for placement of a finger which will provide the rotational force to move each of movable legs 34 and 36 towards a center stationary leg 56. Center stationary or third leg 56 is affixed to support risers 28 for maintenance in a generally fixed position with respect to pivotal movement of the movable legs 34 and 36. Each of the legs, 34, 36 and 56 is provided with a frictional cap 40.

In effect, two manually operable, tweezer legs 34 and 36 are movable towards engagement with the third or stationary leg 56, and therefore, each movable leg forms a tweezer like action in conjunction with the third leg. In the particular embodiment illustrated, the nonworking ends of the movable legs are pivoted about a common apex such that the legs and apex form a biased tweezer which if removed from the frame would function such that the movable legs would move towards engagement with each other. Of course, the movable legs of the present invention need not necessarily join a common apex to form a removable, biased tweezer.

Figure 2:
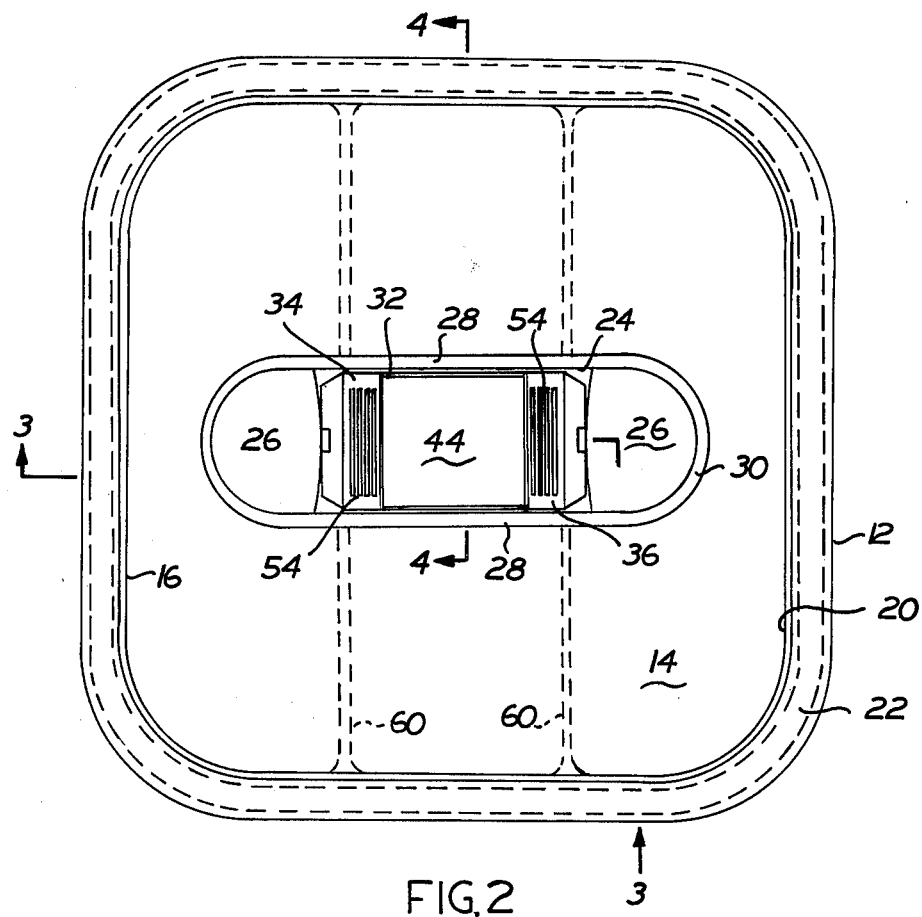
FIG. 2 is a top plan view of the grasping device shown in FIG. 1.

FIG. 2 is a top plan view of the grasping device of FIG. 1, the same numerals being used throughout the specification to designate the same parts or portions. The phantom lines with respect to flange 22 show that the thickness of the flange is approximately that of upstanding side wall 16. The generally flat support 14 may be reinforced by support ridge 60 on the bottom side of the generally flat support 14. It will also be noted from FIG. 2 that upstanding sidewall 16 flares slightly outwardly as the upstanding wall increases in height above the generally flat support and that the movable legs of tweezers 32 contact the edge of finger wells 26 when the movable legs are in their rest position as shown in FIGS. 1 and 2.

Figure 3:
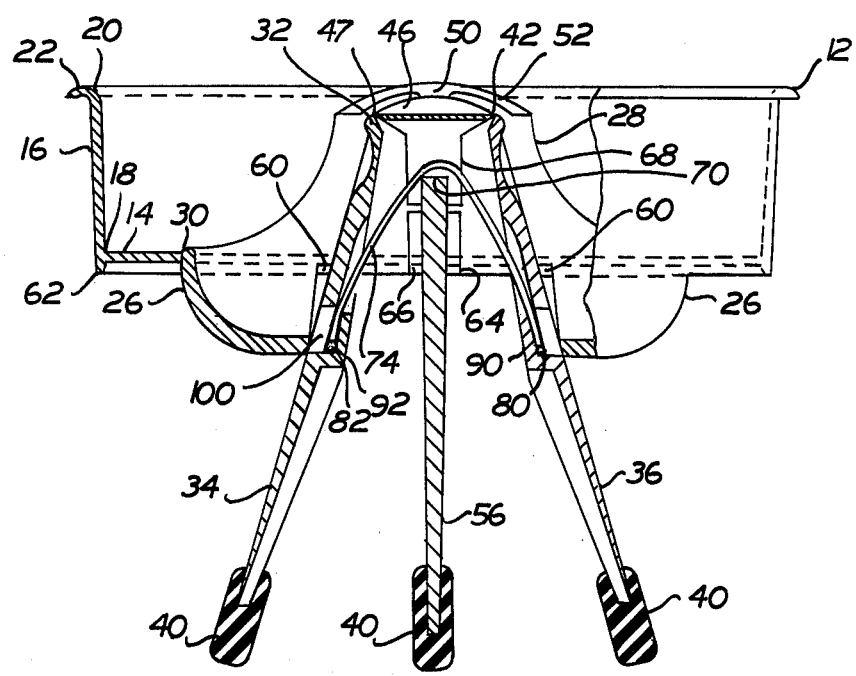
FIG. 3 shows the left-hand portion of the grasping device in section along line 3—3 of FIG. 2 with the right-hand portion being a side plan view.

FIG. 3 is a view of the grasping device of FIG. 2 along line 3—3 showing the left-hand portion of the grasping device in cross section and showing the right-hand portion in side plan view. Peripheral support rib 62 may also be provided to add strength to frame 12, peripheral support rib 62 being located at the outer periphery 18 of generally flat support 14 and being integrally formed with underlying support ribs 60. From FIG. 3 the interior structure of the tweezer and its relative position with respect to frame 12 will become more apparent. Stationary leg 56 is positioned with respect to frame 12 by welding or any other suitable means, a preferred form using two raised ridges 64 and 66 on support riser 28 to form a channel for positioning the stationary leg 56 which then may be welded or otherwise attached to the interior face of the riser 28. Depending from raised shoulder 46 of tweezer 32 and forming an extension thereof is depending fork 68 the two prongs of which slidably engage the top surface 70 of stationary leg 56.

It will be apparent from FIGS. 1 and 3 that depending fork 68 together with the channel 48 in raised shoulder 46, raised ridge 50 and semicircle boss 52 help keep apex 44 of tweezer 32 generally stationary with respect to the frame 12. Such an arrangement helps prevent rotational movement of the apex which misaligns relative movement between the movable legs and the stationary leg 56 such that all three legs no longer terminate at one point as is desired.

Figure 7:
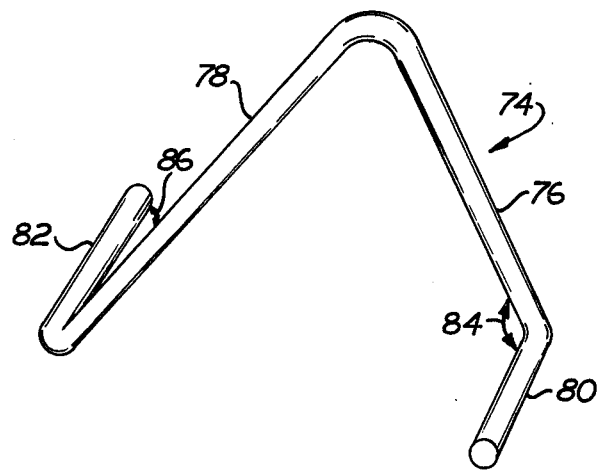
FIG. 7 is a three-dimensional pictorial view of the leaf spring shown in FIG. 3.

Tweezer 32 can be integrally molded with a plastic material in a generally flat condition as shown in FIGS. 5 and 6, and therefore, the pivot lines at 47 and 42 at the apex 44 render the tweezer self-biasing. If desired, the tweezer may be furthered biased by use of a metallic leaf spring 74. As shown in FIG. 7, the leaf spring 74 comprises two main legs 76 and 78 forming a generally U-shaped spring, the legs being in a common plane. Each of major legs 76 and 78 is connected to a seating leg, designated 80 and 82, respectively. Seating legs 80 and 82 are joined to the main legs 76 and 78 such that major legs 76 and 78 intersect the two seating legs 80 and 82 at acute angles 84 and 86.

As seen in FIG. 3, seating legs 80 and 82 of leaf spring 74 are positioned on movable legs 36 and 34 by means of L-shaped brackets 90 and 92, the two main legs of leaf spring 74 extending upwardly and moving freely in the interior space provided between tweezer 32 and stationary or third leg 56.

Figure 4:
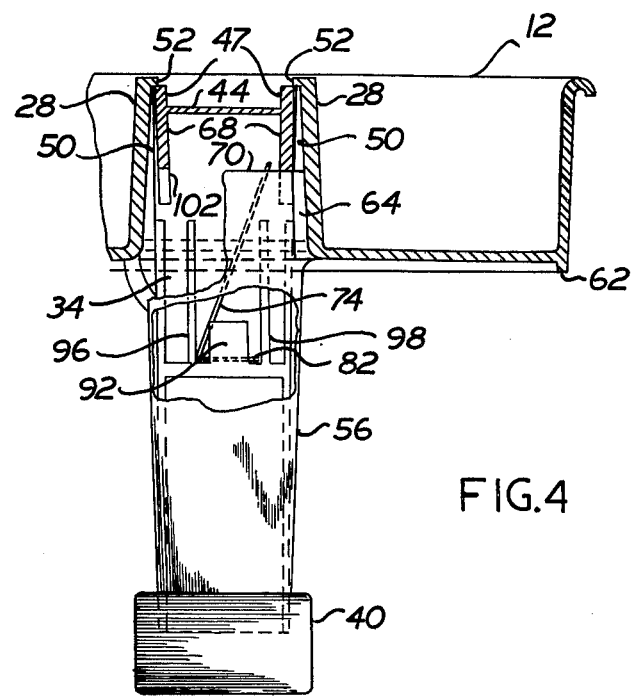
FIG. 4 is a cross section along line 4—4 of FIG. 2 with portions of the center stationary leg being broken away.

FIG. 4 shows a cross section along line 4—4 of FIG. 2 with some portions of the stationary or third leg 56 broken away to more clearly demonstrate the interior structure of movable leg 34 and leaf spring 74.

Seating leg 82 of leaf spring 74 is positioned within bracket 92 of movable leg 34 and held against lateral movement by means of longitudinally extending, strengthening ribs 96 and 98. As shown in FIG. 3, opening 100 results from the molding procedure in creating bracket 92, but need not be necessarily present if leaf spring 74 is not employed or other suitable means are employed for anchoring the ends of the leaf spring.

The interaction between depending forks 68 and top surface 70 of stationary or third leg 56 is also more clearly apparent. For each fork 68, the back leg or prong 102 is shown, the corresponding front prong not being present in this sectional view. Positioning ridge 64 and raised ridge 50 are also shown which, respectively, position the stationary or third leg 56 and slidably engage the channel 48 in depending forks 68 as more clearly described above.

The apex and movable legs of tweezer 32 will now be described with reference to FIGS. 5 and 6 showing the tweezer as molded in a generally flat form without the friction ends 40. In FIG. 5, the right-hand portion of the tweezer is shown in top plan view to better illustrate the features heretofore described. It will also be noted that the working end 38 of movable leg 36 has semicircular recesses 110 which serve to interlock and maintain the friction cap 40 on the working end 38. The left-hand portion of the tweezer in FIG. 5 is shown in phantom to illustrate the undersurface showing longitudinally extending ribs 96 and 98 described above with respect to positioning the seating leg 82 of leaf spring 74 and also showing additional longitudinally extending support and stiffening ridges 112 and 114 extending along the outer edge of movable leg 34. FIG. 6 shows the tweezer of FIG. 5 partially in cross section on the right-hand side and partially in side view on the left portion with additional interior structures shown in phantom. In considering FIGS. 5 and 6, the structure of the depending fork 68 as an extension of raised shoulder 46 connected to flat apex 44 will become apparent. The depending fork 68 terminates in two prongs 102 and 116. The elevational relationship between the fork 68, finger depressions 54, opening 100, and bracket 90 will also become more apparent.

From the foregoing, it will be appreciated that the structure of tweezer 32 and the correspondingly engaging portions of frame 12 permit the apex 44 of tweezer 32 to be held relatively stationary with respect to frame 12 providing proper operation of the grasping device and also providing a structure. whereby the tweezer 32 and frame 12 can be manufactured in separate pieces.

From the above description of the structure and operation of the grasping device of the present invention, the following advantages will become readily apparent. One advantage lies in the provision of a stationary leg 56 in combination with the other elements of the grasping device. If a device as shown in FIG. 1 is employed without the third or stationary leg 56, the operator of the device may have a tendency to apply unequal pressure on the two movable legs. In that event, not only do the movable legs not terminate at the same position but also the legs do not contact each other at a point directly under the apex 44. Such an operation results in the inability to grasp the desired object. In effect, one movable leg sweeps the surface of the object to be grasped while the other leg merely touches or remains above the surface of the object.

A second advantage of the grasping device of the present invention exists in the ability of the device to operate utilizing only one movable leg. In employing the grasping device shown in FIG. 1, the operator sometimes places the thumb and second finger on the exterior surface of the two risers 28 while placing the first finger on one of the finger depressions 54 leaving the other finger depression idle. In such a case, pressure by the first finger results in the movement of only one of the movable legs, and without stationary of third leg 56, no object would be grasped. However, the present invention has the advantage of allowing operation by utilization of only one of the movable legs.

A third advantage in the grasping device of the present invention involves the relative position of the finger wells 26 and finger depressions 54 with respect to movable legs 34 and 36. As best seen in FIG. 3, by providing relatively deep finger wells 26 an operator may position his or her fingers in finger depressions 54 sufficiently down the length of the movable legs 34 and 36 towards the working end of each leg thereof such that a lower working pressure is required for operation of the grasping device.

The materials employed for constructing the preferred grasping device may be selected from a wide variety of materials. Plastics, such as polypropylene, are particularly suitable for all portions of the device except the leaf spring 74 and the friction caps 40, since plastics may be easily molded. Leaf spring 74 is preferably constructed of a metallic material while friction caps 40 are preferably a rubbery type material such as a styrene-butadiene rubber which can be preformed and placed on the working end of the legs or conversely the working ends of the legs may be dipped into a thick mixture of the rubber material.

The operation of the grasping device of FIG. 1 will now be more particularly described with reference to FIG. 8 which has a container 120 with an opening 122 corresponding to the outer shape of grasping device 10. Within container 120 is a stack of articles 124 each of which has a generally flat surface 126 which is exposed when resting as the top of article 128 in the stack 124. As shown in FIG. 8, the stack of articles 124 is easily recognized as a nested group of dish-shaped filters, such as those commonly used in automatic drip coffee makers. Each coffee filter 128 has an inside flat bottom surface 126 and an upstanding side wall 130.

The grasping device 10 is positioned within opening 122 of container 120 until the third or stationary leg 56 engages the inside bottom surface 126 of the top filter 128. The location of the opening 122 in container 120 is such that the stationary leg 56 will be positioned in the central portion of the bottom surface 126. Then, preferably, both movable legs of tweezer 32 are moved toward the stationary leg 56 by pressure from the operator's fingers at finger depressions 54 located adjacent finger wells 26. As seen in FIG. 8, the movable legs 34 and 36 are pivoted towards the stationary leg 56 until further movement is prohibited at which point two small portions 136 and 138 of the bottom surface 126 of finger 128 will be pinched in the form of folds between the working ends of the three legs. Naturally, if only one of the movable legs is operated, only one of the folds 136 and 138 will be present.

With the filter paper 128 in the grasp of the device 10, the device and the filter paper are then jointly removed from container 120. After removal, the pressure on the movable legs can be released which in turn releases the filter paper 128.

Figure 8:
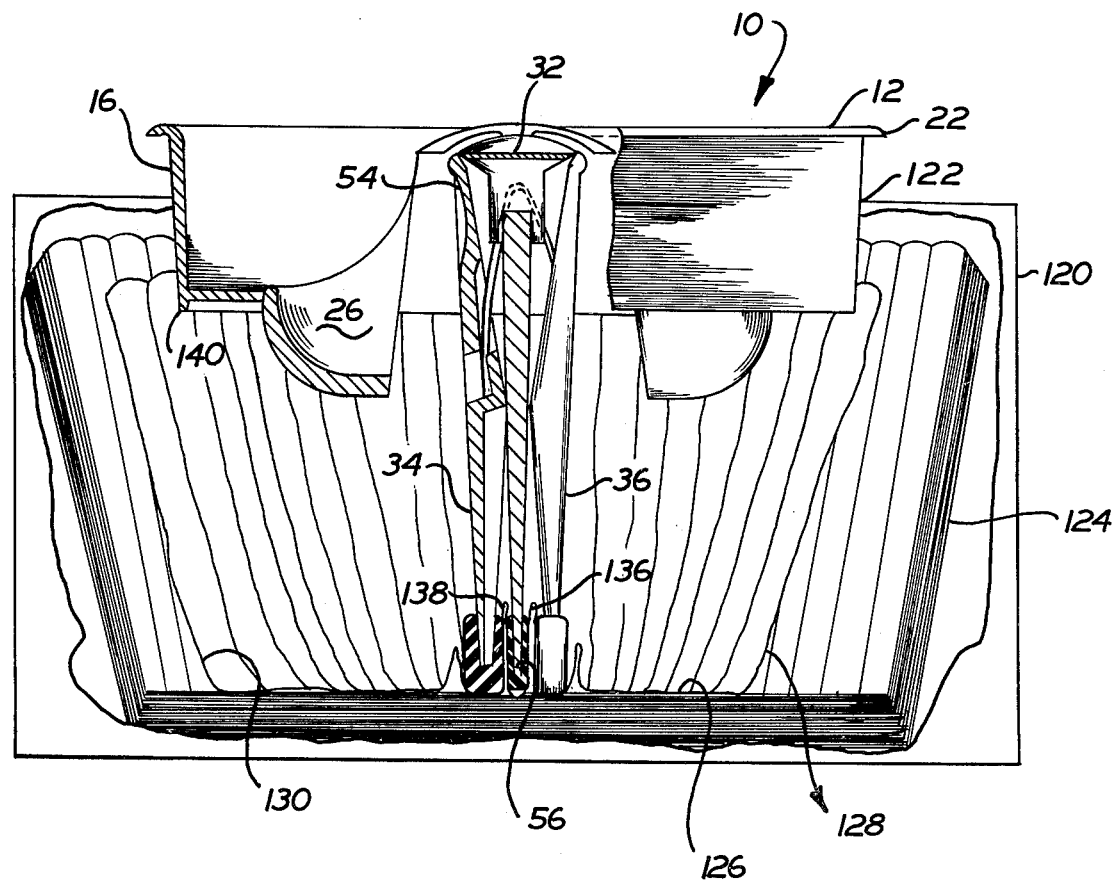
FIG. 8 is a view of the grasping device of FIG. 1 in combination with a container and articles to be dispensed, a portion of the side of the container being broken away to view the grasping device in its closed position with the grasping device partly in side plan view and partly in cross section.

In the context of the operation of the grasping device 10 shown in FIG. 8, the functions of frame 12 will become apparent. The third leg is maintained stationary with respect to the apex and articles to be grasped by the frame during rotation of the movable legs toward the third leg. Frame 12 also serves as a locator and a positioner of the grasping device 10 with respect to the stack of articles 124 within container 120. The interfitting relationship between the grasping device 10 and opening 122 in container 120 not only locates the three legs with respect to the central portion of the inside bottom surface 126 of the top filter 128 but also positions the grasping device 10 and holds it relatively stationary with respect to the top article 128 as the two movable legs are rotated by the operator.

Another function of the frame or housing 12 involves the height of the side wall 16. The height of the side wall 16 is such that it will engage the opening 122 in container 120 at least above its lower edge 140 when grasping the first article to be dispensed from the container 120. The flange 22 is positioned at the upper end of side wall 16 such that it engages the opening 122 when the grasping device 10 is attempting to remove the last article within container 120. In this manner, the functions and advantages of frame 12 will be utilized in dispensing every article within container 120. Thus, the height of side wall 16 is preferably at least approximately equal to or greater than the net distance of the grasping device when positioned to grasp the first and last articles to be dispensed.

For the sake of clarity, frame 12 of the grasping device 10 is shown in FIG. 8 as being capable of being positioned within interior of the stack of articles 124. However, if frame 12 is incapable of fitting within the interior of the articles, the length of the removable and stationary legs will be such that they can contact the interior bottom surface with frame 12 touching or being slightly above the top edge of the articles.

What is claimed is:

1. A grasping device comprising:
   a frame adapted to be held generally stationary with respect to an article being grasped;
   said frame comprising a generally flat support, an aperture in the support, and a support riser adjacent to the aperture in the support and projecting from the support;
   two manually operable, movable tweezer legs supported by said frame;
   a third leg positioned between the two movable tweezer legs and attached to said support riser and held generally stationary with respect to the frame so that each movable leg is movable relative to the third leg and the frame;
   said two movable legs and said third leg each having a length such that all three legs terminate at approximately at the same point when the movable legs are closed against the third leg;
   said movable legs being positioned and adapted for pivotal movement toward the third leg such that relative movement of the three legs lies in a common plane; and
   means at the end of each leg for frictionally engaging an object to be grasped.

2. A method of dispensing articles comprising:
   providing a stack of articles with each article having a generally flat surface which is exposed when resting as the top article in the stack;
   providing a grasping device as claimed in claim 1
   resting the third leg of the grasping device against the generally flat surface of the top article in the stack;
   moving at least one movable leg towards said third leg until a portion of the surface of the top article becomes pinched therebetween; and
   removing the grasping device with the top article held therein from the stack of articles.

3. A method as claimed in claim 2 wherein the stack of articles comprises a nested stack of dish-shaped filters, each filter having a side and a generally flat inside bottom surface.

4. A grasping device comprising: a dish-shaped frame adapted to slidably engage an opening in a container having articles therein to be removed, said frame having:
   a generally flat support;
   a side wall at the outer periphery of the support projecting outwardly from a first side of the support;
   an aperture in the support extending from the first side to a second side of the support;
   a support riser adjacent the aperture in the support and projecting outwardly from the first side of said support;
   a stationary leg attached to the support riser and projecting outwardly from the second side of said support;
   a biased tweezer having two movable legs mounted on the frame so that each movable leg is movable relative to the stationary leg therebetween; and
   means on the end of each leg for frictionally engaging an object to be grasped.

5. A grasping device comprising:
   a dish-shaped frame adapted to slidably engage an opening in a container having articles therein to be removed, said frame having:
   a generally flat support;
   a side wall at the outer periphery of the support projecting outwardly from a first side of the support;
   an aperture in the support extending from the first side to a second side of the support;
   two finger wells opening into the first side of said support and projecting from the second side thereof;
   a support riser adjacent the aperture in the support and projecting outwardly from the first side of said support;
   a stationary leg attached to the support riser and projecting beyond the finger wells on the second side of said support;
   a biased tweezer having an apex and two movable legs and at least one fork engaging the stationary leg to mount the tweezer on the frame so that each movable leg is movable relative to the stationary leg therebetween; and
   means on the end of each leg for frictionally engaging an object to be grasped.

6. A grasping device as claimed in claim 5 having a depression in each movable leg adjacent the finger well and adapted to receive a finger intending to pivot the movable leg towards the stationary leg.

7. A grasping device as claimed in claim 5 wherein the movable legs of said tweezer are biased outwardly from the stationary leg by a generally U-shaped spring having two ends each of which is positioned on one of the movable legs.

8. A grasping device as claimed in claim 5 wherein two forks project from said apex, each fork having a channel therein, said support riser comprising two walls disposed on opposite sides of the aperture and each having a raised ridge for slidably engaging the corresponding channel of the fork, and said stationary leg extending between said walls to be received in said forks.

9. A dispensing apparatus comprising a container having articles therein to be dispensed and an opening in the container through which the articles can be dispensed, a grasping device as claimed in claim 5 removably positioned within the opening of the container so that upon movement of at least one of the movable legs of the grasping device an article is grasped by the device and may be removed from the container through the opening therein by separation of the grasping device and the container.

10. A dispensing apparatus as claimed in claim 9 wherein said articles comprise a nested stack of dish-shaped filters and wherein the height of the side wall of the frame of the grasping device is at least approximately equal to the net distance between the positions of the grasping device in grasping the first and last articles in the stack.

* * * * *